(12) United States Patent
Eastham et al.

(10) Patent No.: US 7,149,742 B1
(45) Date of Patent: Dec. 12, 2006

(54) SYSTEM AND METHOD FOR REMOTE DATA ACCESS

(75) Inventors: Gary Eastham, Frisco, TX (US); Brent Robertson, Richardson, TX (US); Jeff Woods, Garland, TX (US)

(73) Assignee: Informatics, Inc., Plano, TX (US)

( * ) Notice: Subject to any disclaimer, the term of this patent is extended or adjusted under 35 U.S.C. 154(b) by 450 days.

(21) Appl. No.: 10/147,254

(22) Filed: May 16, 2002

(51) Int. Cl.
*G06F 17/30* (2006.01)

(52) U.S. Cl. ...................... 707/101; 707/102

(58) Field of Classification Search ............. 707/1–10, 707/100–104.1, 200–206; 709/246
See application file for complete search history.

(56) References Cited

U.S. PATENT DOCUMENTS

| | | | |
|---|---|---|---|
| 6,393,434 B1 * | 5/2002 | Huang et al. | 707/200 |
| 6,772,159 B1 * | 8/2004 | Blount et al. | 707/10 |
| 6,782,379 B1 * | 8/2004 | Lee | 707/2 |
| 6,810,429 B1 * | 10/2004 | Walsh et al. | 709/246 |

* cited by examiner

*Primary Examiner*—Jeffrey Gaffin
*Assistant Examiner*—Yicun Wu

(57) ABSTRACT

A system for remote database access is provided. The system includes an enterprise database that stores two or more sets of data. A data synchronizer receives one or more user-defined sets of data and generates one or more templates that define the relationship between the two or more sets of data in the enterprise database and the user-defined set of data. A remote data system receives the user-defined sets of data and receives user-entered data update. The data synchronizer receives the user-entered data update and maps the user-entered data update to the enterprise database using the templates.

20 Claims, 5 Drawing Sheets

SYSTEM AND METHOD FOR REMOTE DATA ACCESS

FIELD OF THE INVENTION

The present invention is related to remote access to a database, and is more specifically related to systems and methods for allowing remote access to databases that do not require the remote access device to maintain database structure data.

BACKGROUND OF THE INVENTION

Systems for allowing remote access to a database are known in the art. These systems for allowing remote access to a database typically use a database structure in the remote system that correlates to the database that is being accessed. In this manner, any changes to records in the database can be coordinated with the master database.

One problem with such known systems for allowing remote database access is that the amount of overhead data for maintaining the database structure in the remote access device can be significant. For example, the relationships between tables in the database must be maintained so that any changes to data records can be stored in the appropriate table locations. As a result, these prior art systems require significant processor and memory overhead, which reduces the amount of processor and memory capacity for storage of data and processing of data.

Although some simple remote access devices and systems allow data structures to be accessed using a remote device that reduces the amount of overhead, these other systems and methods use predefined data structures. These predefined data structures, such as address book data structures, calendar data structures, or other similar data structures, do not provide the user with the flexibility to generate data structures that may be suited to a particular purpose. In these applications, it is necessary to use processor and memory intensive systems that maintain the database relationships of the parent database.

SUMMARY OF THE INVENTION

In accordance with the present invention, a system and method for providing remote database access are presented that overcome known problems with providing remote database access.

In particular, a system and method for providing remote database access are provided that allow a user to configure the data required for remote access and that eliminate the need for the remote access device to maintain the parent database overhead.

In accordance with an exemplary embodiment of the present invention, a system for remote database access is provided. The system includes an enterprise database that stores two or more sets of data. A data synchronizer receives one or more user-defined sets of data and generates one or more templates that define the relationship between the two or more sets of data in the enterprise database and the user-defined set of data. A remote data system receives the user-defined sets of data and receives user-entered data update. The data synchronizer receives the user-entered data update and maps the user-entered data update to the enterprise database using the templates.

The present invention provides many important technical advantages. One important technical advantage of the present invention is a system and method for providing remote database access that use an intermediate system to maintain the parent database relationships, such that the use of memory and processor resources can be optimized for the remote database access device.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
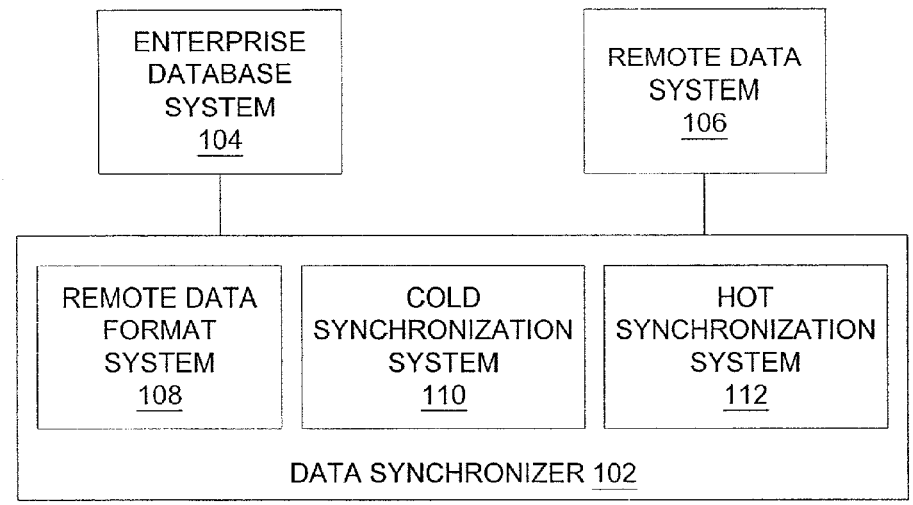
FIG. 1 is a diagram of a system for providing remote access to a database in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for providing remote access to a database in accordance with an exemplary embodiment of the present invention. System 100 allows a user to structure the remote access system to have data records of interest, and maintains continuity between the remote access system and the parent database with minimal overhead requirements in the remote access system.

System 100 includes data synchronizer 102, which is coupled to enterprise database system 104 and remote data system 106. As used herein, the term "couple" and its cognate terms, such as "couples" and "coupled," can include a physical connection (such as a fiber optic conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a processing platform.

Data synchronizer 102 can be implemented in hardware, software, or a suitable combination of hardware and software, and can be one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software structures. In one exemplary embodiment, a software system can include one or more lines of code in a general purpose software application, such as an operating system, and one or more lines of software in a specific purpose software application.

Data synchronizer 102 interfaces with enterprise database system 104, which can be a suitable database system storing a master database, such as for use within a large enterprise. Likewise, data synchronizer 102 interfaces with remote data system 106, which can be a palm computing platform, a hand-held computing platform, or other suitable computing platforms such as those having limited processor and memory capacity. Data synchronizer 102 allows a user to structure a data table for use through remote data system 106 based on database fields and records in enterprise database system 104. Data synchronizer 102 then maintains the data relationship between the remote data system 106 and enterprise database system 104 in a manner that allows modifications to remote data system 106 to be correctly implemented in enterprise database system 104, and modifications to enterprise database system 104 to be properly updated in remote data system 106.

Data synchronizer 102 includes remote data format system 108, cold synchronization system 110, and hot synchronization system 112, each of which can be one or more software systems operating on a general purpose processing platform or other suitable systems. Remote data format system 108 interfaces with enterprise database system 104 and allows a user to select one or more data fields, data records, or other data structures from enterprise database system 104 for use with remote data system 106. In one exemplary embodiment, remote data format system 108 can allow a user to view available data structures in enterprise database system 104, and to select discrete data structures for combination into a single data table for use through remote data system 106. For example, remote data format system 108 can allow a user to compile records from multiple data tables, such as to allow the user to include address data for a customer, order history data for the customer, contact data for the customer, or other typically unrelated sets of data into a single dataset. Remote data format system 108 then accesses enterprise database system 104 to populate a dataset for use with remote data system 106. Remote data format system 108 can also determine and store data relationships within enterprise database system 104, such that any modifications to the data used by remote data system 106 can then be reflected to the proper fields within enterprise database system 104. For example, the company may have a first telephone number field associated with it, and may then relate to a second data table that includes salespersons that also have associated phone numbers. Remote data format system 108 maintains the identity of the telephone number data field such that any changes to the telephone number made by remote data system 106 will be accurately reflected in the correct telephone number field within enterprise database system 104.

Cold synchronization system 110 performs synchronization between data records from remote data system 106 and data records stored on enterprise database system 104. Cold synchronization system 110 can receive data format data from remote data format system 108, such as to allow cold synchronization system 110 to identify the correct data records and fields and other data structures within enterprise database system 104 that correspond to data stored on remote data system 106. Likewise, cold synchronization system 110 can perform other functions associated with synchronizing the data records stored on remote data system 106 with the data stored on enterprise database system 104.

Hot synchronization system 112 is used to retrieve and store data on remote data system 106. In one exemplary embodiment, hot synchronization system 112 can include a physical interface device and an operating system that allow remote data system 106 to be synchronized with hot synchronization system 112 in operation. For example, remote data system 106 can be a hand-held computing device and hot synchronization system 112 can be the cradle and associated operating system that is used to generate a data file such as a palm database file or replicated data file from remote data system 106 onto an operating system or a general purpose processor platform. Hot synchronization system 112 coordinates with cold synchronization system 110, such as to initiate cold synchronization upon the completion of hot synchronization.

In operation, system 100 is used to allow a remote data system 106 to store data from an enterprise database system 104 and to perform updates to that data without requiring remote data system 106 to maintain the database structure or store other overhead information that may be required in order to relate the data stored on remote data system 106 to enterprise database system 104. System 100 allows the user to configure the data stored on remote data system 106 as desired by the user, so as to provide flexibility. Likewise, system 100 allows data relationships between enterprise database system 104 and remote data system 106 to be tracked in a manner that insures data reliability and compatibility.

Figure 2:
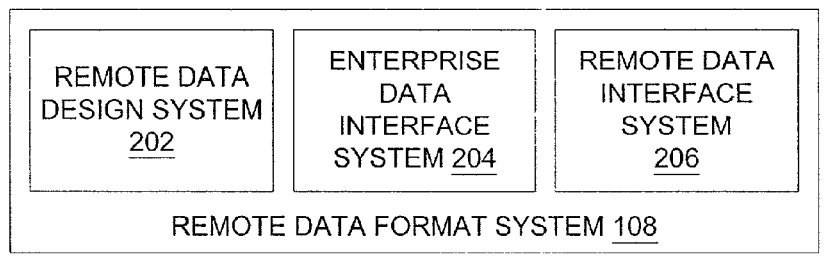
FIG. 2 is a diagram of a system for providing remote data format functionality in accordance with an exemplary embodiment of the present invention.

FIG. 2 is a diagram of a system 200 for providing remote data format functionality in accordance with an exemplary embodiment of the present invention. System 200 includes remote data format system 108 and remote data design system 202, enterprise data interface system 204, and remote data interface system 206, each of which can be implemented in hardware, software, or a suitable combination of hardware and software, in which can be one or more software systems operating on a general purpose processor platform.

Remote data design system 202 generates a graphic user interface that allows the user to view data structures of enterprise database system 104 and to assemble the data structures into a single table for use with a remote data system 106. In one exemplary embodiment, remote data design system 202 can allow a user to select columns in multiple tables for assembly into a single table. Likewise, remote data design system 202 can allow the user to select one or more filters for data stored on enterprise database system 104. In one exemplary embodiment, a data filter can limit in a set of data to a pre-determined data range, such as a numeric data range, an alphanumeric data range, an alphabetic data range, or other suitable data ranges. Likewise, the filter can require an exact match in a data field. Remote data design system thus receives user selection data and generates remote data format data.

Enterprise data interface system 204 receives the remote data format data from remote data design system 202 or other suitable data and interfaces with an enterprise database system 104 or other suitable systems to determine data relationships between the selected data and to obtain data from enterprise database system 104. In one exemplary embodiment, enterprise data interface system 204 can generate templates such as XML files or other suitable files that are used to track the table queries, joins, filters, or other suitable data access functions so that synchronization of the remote access data can be performed. Enterprise data interface system 204 uses these structures to assemble the data table designed through remote data design system 202.

Remote data interface system 206 receives the data generated by enterprise data interface system 204 and structures the data for provision to a remote data system 106. In one exemplary embodiment, remote data interface system 206 can generate a palm database file or other suitable files for use with a hand-held computer, palmtop computer, or other suitable computers.

In operation, system 200 allows a user to structure data for access through a remote data system 106. The data structure for the enterprise database system 104 or other suitable systems that are the master data system allows the correlation between the remote data system and the master data system to be maintained, such that any changes to the remote data can be matched with and reinstalled to the master data.

Figure 3:
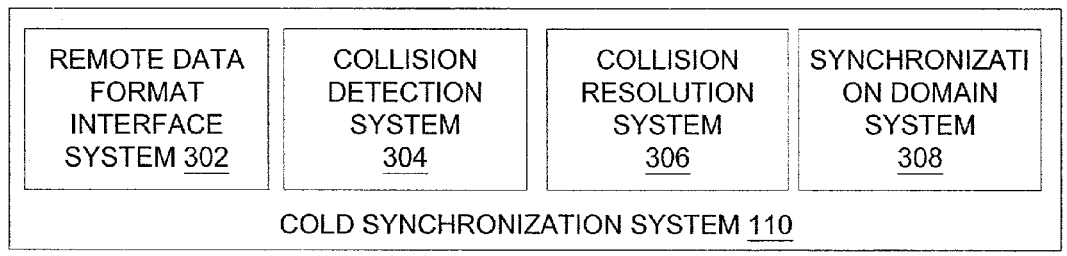
FIG. 3 is a diagram of a system for synchronizing a remote database with a master database in accordance with an exemplary embodiment of the present invention.

FIG. 3 is a diagram of a system 300 for synchronizing a remote database with a master database in accordance with an exemplary embodiment of the present invention. System 300 includes cold synchronization system 110 and remote data format interface system 302, collision detection system 304, collision resolution system 306, and synchronization domain system 308, each of which can be implemented in hardware, software, or a suitable combination of hardware and software, which can be one or more software systems operating on general purpose processor platforms.

Remote data format interface system 302 receives remote data format data, such as from a remote data design system 202, and uses the remote data format data to interface with enterprise database system 104 or other suitable systems. In one exemplary embodiment, remote data format interface system 302 can determine an appropriate action to be performed for the remote dataset, such as storing data that was changed on the remote device to an enterprise database, storing data that was changed from the enterprise database to the remote device, or other suitable functions. Remote data format interface system 302 can also insure that the appropriate data field or record or data structure is being modified in the appropriate database.

Collision detection system 304 determines whether a data record, field, structure, or other structure in both the remote data system 106 and enterprise database system 104 have been modified, such that a collision has occurred. In one exemplary embodiment, a data record can be modified from both the remote data system 106 and enterprise database system 104, such that the state of the data is indeterminate. Collision detection system 304 can generate a user interface requesting selection of the correct data state from a user, can determine whether a pre-existing rule has been created, and can perform other suitable functions.

Collision resolution system 306 stores one or more rules for resolution of collisions between data changed by remote data system 106 and enterprise database system 104. In one exemplary embodiment, collision resolution system 306 can store predefined rules for each field, all fields, or all data structures, or other suitable rules that allow collisions between changed datasets to be resolved. In one exemplary embodiment, a rule such as to always use the data stored in enterprise database system 104 can be implemented, as well as a rule to always use the data stored on remote data system 106 or other suitable rules. Likewise, collision resolution system 306 can set ranges, such that a change of a certain magnitude in either remote data system 106 or enterprise database system 104 will be accepted over a change outside of that field, or other suitable functions.

Synchronization domain system 308 maintains synchronization domain data for use in a remote database access system. In one exemplary embodiment, synchronization domain system 308 can store data records that fall within a pre-determined synchronization domain, such as a domain of records that are or have been accessed through a remote data system 106. In this exemplary embodiment, synchronization domain system 308 can be used to track the state of the data stored on remote data system 106 so as to identify data records that may need to be updated on remote data system 106, on enterprise database system 104, or other suitable data records.

In operation, system 300 is used to perform synchronization of a remote database with a master database. System 300 allows the data structure for an enterprise database or other master database to be maintained in a location other than the remote data system 106, so as to allow limited computational and data memory capacity of such remote data systems 106 to be optimized. Likewise, conflicts between data changed on both the remote and enterprise database can be detected and resolved, users can be queried for resolution of such conflicts, and a synchronization domain can be updated using system 300.

Figure 4:
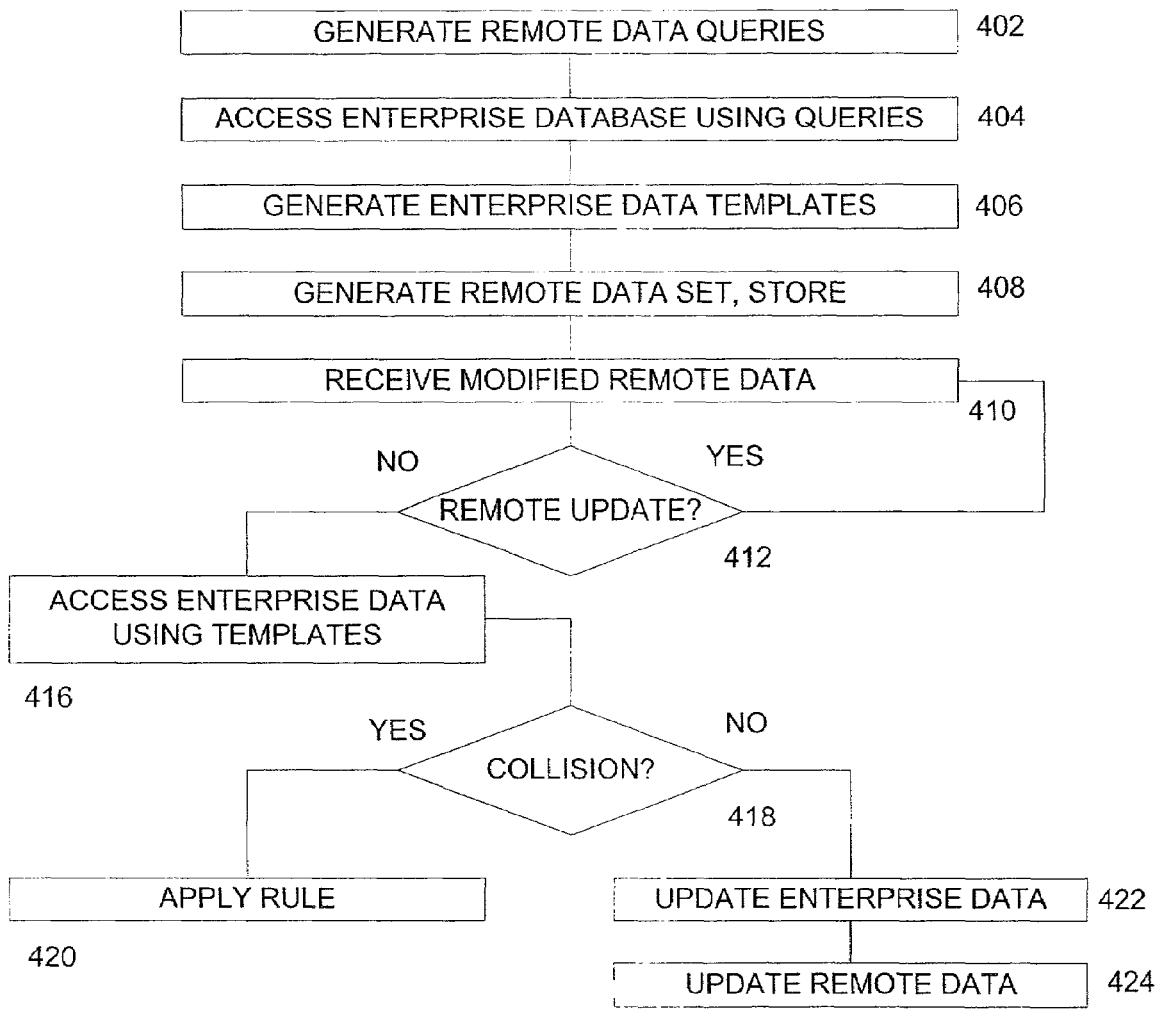
FIG. 4 is a flowchart of a method for providing remote database access in accordance with an exemplary embodiment of the present invention.

FIG. 4 is a flowchart of a method 400 for providing remote database access in accordance with an exemplary embodiment of the present invention. Method 400 allows a remote database to be coordinated with a master database in a manner that does not require the remote database to store data structure relationships or to otherwise maintain overhead, and further allows problems with data synchronization to be readily detected.

Method 400 begins at 402 where a remote data query is generated. The remote data query can include one or more records, fields, data structures, other suitable data structures from a master database, an enterprise database, or other suitable data sources. The remote data query can further include range limiters, field limiters, or other suitable data. The method then proceeds to 404.

At 404, an enterprise database is accessed using the query. In one exemplary embodiment, a suitable master database can be used, and the query can be used to define links, joins, filters, files, or other suitable data structures or access functions. The method then proceeds to 406. At 406, one or more enterprise data templates are generated. In one exemplary embodiment, the enterprise data templates can be generated using XML or other suitable programming that allows data relationships to be maintained and identified. The method then proceeds to 408.

At 408, a remote dataset is generated and stored. In one exemplary embodiment, the remote dataset can be a palm database dataset, and the palm database dataset can be stored on a hand-held device such as a palmtop computer or other suitable devices. The method then proceeds to 410.

At 410, modified remote data is received, such as by modifying data records using a palm computer or other suitable remote device. The method then proceeds to 412 where it is determined whether a remote update, such as a hot sync has been initiated. If the remote update has not been updated, then the method returns to 410. Otherwise, the method proceeds to 416 where the hot sync or other remote update is first performed, after which a cold synchronization or enterprise database synchronization is performed. The enterprise database is accessed utilizing the templates, other suitable data structure, or format data, so as to allow the records from the remote database to be accurately updated in the master database. The method then proceeds to 418.

At 418, it is determined whether there is a collision. For example, if a change has occurred in a data record for both the remote and master database, a collision has occurred and needs to be resolved. If a collision has not occurred, the method proceeds to 422 where enterprise data is updated using the data stored in the remote database. The method then proceeds to 424 where the remote data is updated, such as using changed data from the enterprise database.

If it is determined at 418 that a collision has occurred, the method proceeds to 420 where a rule is applied. In one exemplary embodiment, the user can be queried for a decision as to the correct data record as the application of the rule or instead of application of a rule. Likewise, suitable rules can be developed in advance to be applied, such as to require selection of the master data record over a remote data record, selection of the master or remote database depending upon the value of one or more pre-determined data fields, or other suitable rules.

In operation, method 400 provides for remote data access to a database by maintaining the relationships of the data records, data structures or other suitable data fields in the master database for the remote data access device so as to eliminate the need for processor or memory overhead in the remote data access device. Likewise, method 400 allows the data relationships to be managed so as to maintain records required for tracking data changes and to insure that collisions or other problems with data are resolved.

Figure 5:
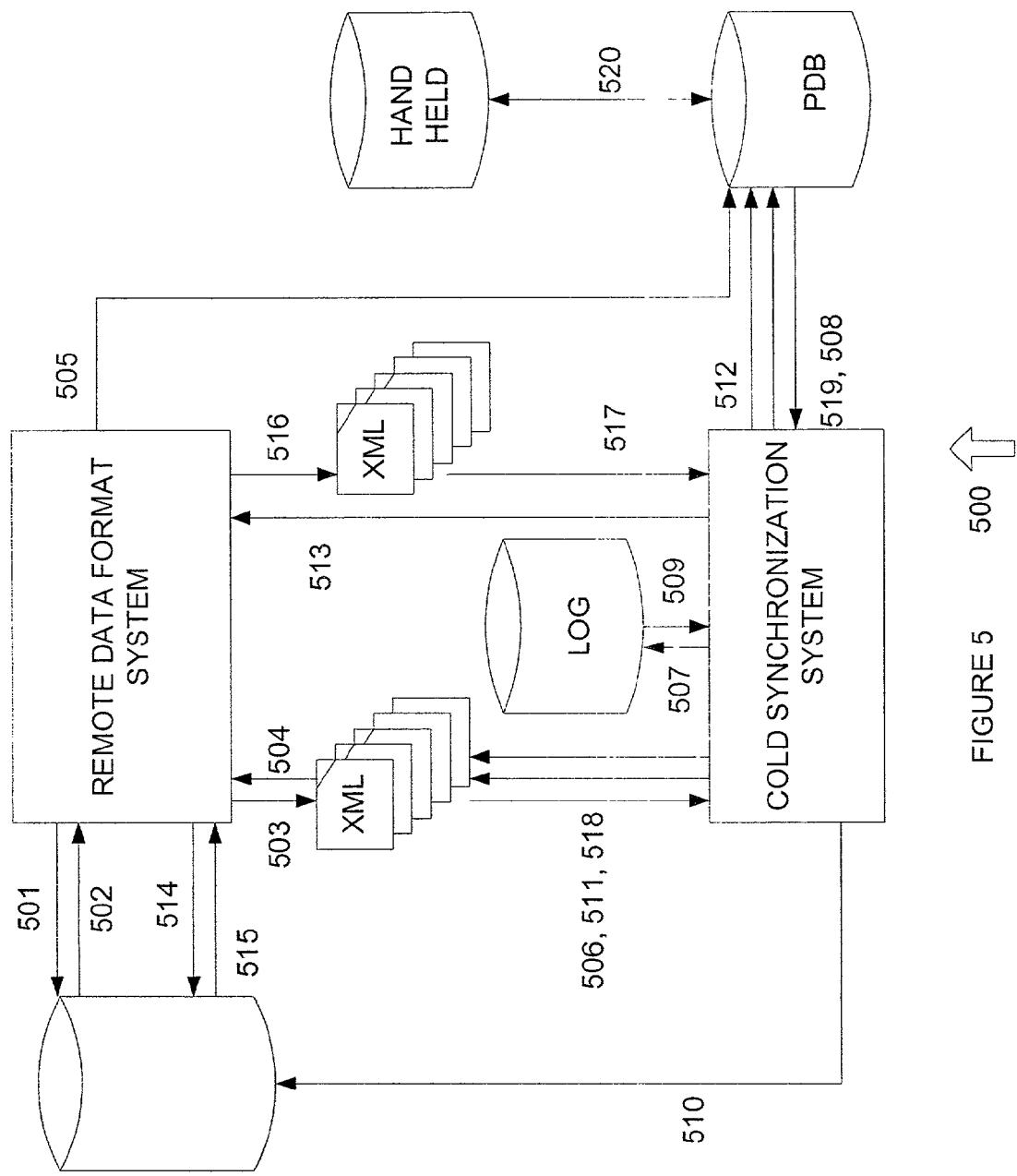
FIG. 5 is a diagram of a system for allowing remote data access in accordance with an exemplary embodiment of the present invention.

FIG. 5 is a diagram of a system 500 for allowing remote data access in accordance with an exemplary embodiment of the present invention. System 500 includes remote data format system that accesses an enetrprise database at 501, where queries are executed that were built using a user interface. At 502, a recordset is retrieved from each table present in a query. The number of records returned depends on the joins and/or filters created in the user interface.

At 503, the remote data format system builds an XML snapshot file or other suitable data structures for each table/query and places them in a data source folder. At 504, the remote data format system processes each XML snapshot file found in the data source folder.

At 505, the remote data format system creates a palm database file or other suitable data structures in the palm install folder and builds tables/fields/records in the palm database file for each XML snapshot file processed.

At 506, the cold synchronization system processes each XML snapshot file found in the data source folder.

At 507, the cold synchronization system builds a cold synchronization log database (access) from the processed XML snapshot files. Each XML snapshot file is used to create tables/fields/records in this log.

At 508, the cold synchronization system extracts the palm database data and determines the appropriate transaction method (insert/update/delete) to execute.

At 509, the cold synchronization system retrieves the transaction determined for each record.

At 510, the cold synchronization system executes the transaction (insert/update/delete) against the enterprise database and determines if a collision or underlying data change has occurred.

At 511, the cold synchronization system synchronizes the XML snapshot files to either the default data or in the case of a collision, the master data.

At 512, the cold synchronization system synchronizes the palm database to either the default data or in the case of a collision, the master data. Likewise, other suitable rules or processes can also or alternatively be implemented.

At 513, the cold synchronization system requests a new XML snapshot set to determine if updated enterprise data records now meet the filter requirements. These will be inserted into a managed record domain.

At 514, the remote data format system re-executes queries against the enterprise database that were built in the user interface.

At 515, the remote data format system retrieves a recordset from each table present in the queries. The number of records returned depends on the joins and/or filters created in the user interface.

At 516, the remote data format system builds an XML snapshot file or other suitable data structure for each table/query and places them in a predetermined data folder.

At 517, the cold synchronization system processes each temporary working snapshot file found in the predetermined folder.

At 518, the cold synchronization system inserts the new enterprise database records into the XML snapshot files.

At 519, the cold synchronization system inserts the new enterprise database records into the palm database query file.

In operation, system 500 allows a remote database to be coordinated with a master database, such as using a handheld device such as a palmtop or handtop computer, or other suitable devices. System 500 allows remote database access to be controlled without requiring the remote device to process database overhead that is required to maintain database integrity.

Figure 6:
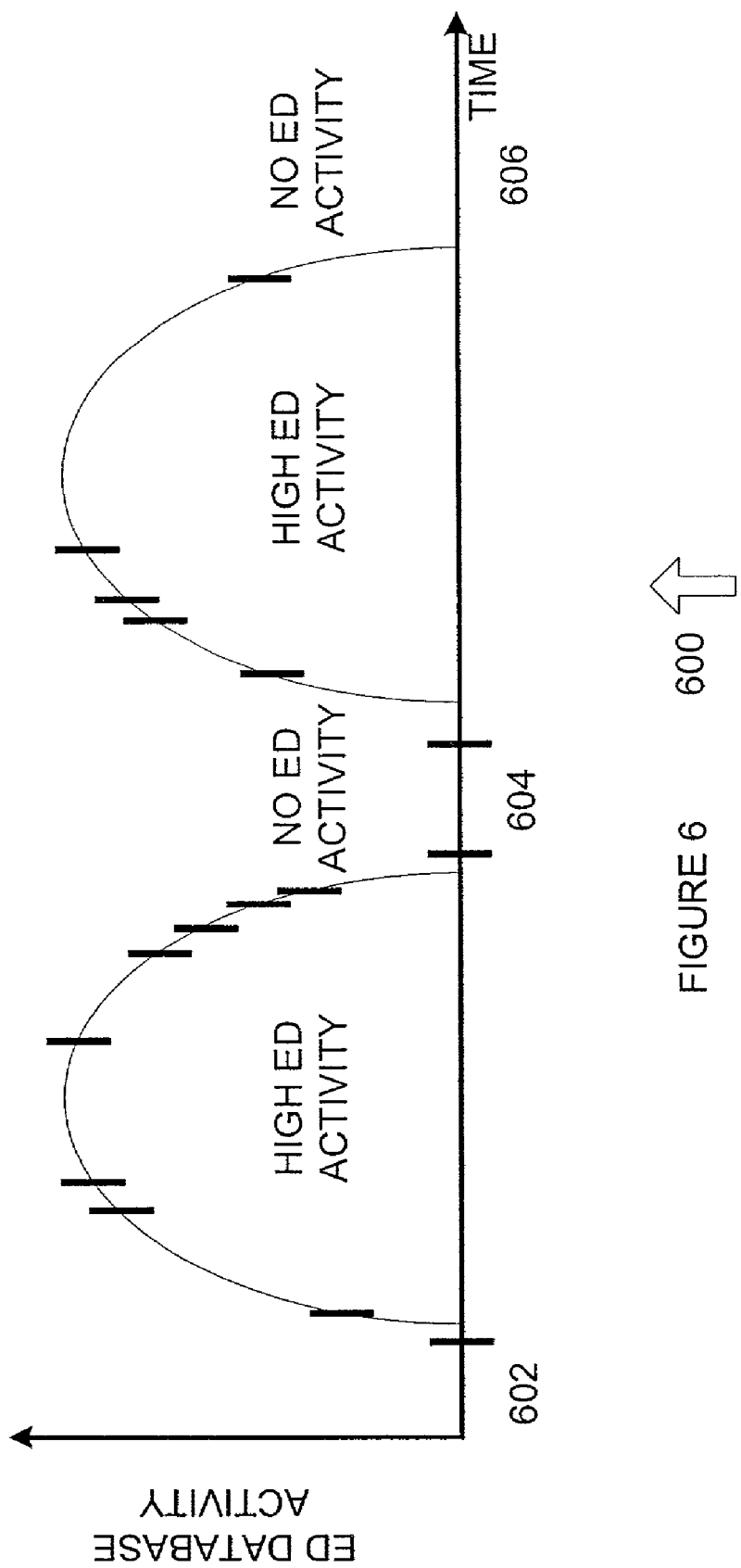
FIG. 6 is a diagram showing exemplary hot synchronization and cold synchronization activity in accordance with an exemplary embodiment of the present invention.

FIG. 6 is a diagram showing exemplary hot synchronization and cold synchronization activity in accordance with an exemplary embodiment of the present invention. FIG. 6 includes a graph of enterprise database activity that has hashmarks indicating hot synchronization activity. At 602, a cold synchronization can be performed because of no excessive enterprise database activity. Thus, when a hot synchronization is performed immediately afterwards, the correlation between the hot synchronization database and the cold synchronization enterprise database is accurate. However, for hot synchronization operations occurring on the curve shown as high enterprise database activity, the correlation to the remote access device can be less than 100%, such that the data is not correctly replicated. Thus, cold synchronization can be delayed until 604 or 606, times when no or little enterprise database activity is occurring. Likewise, hot synchronization activity occurring during high enterprise database activity can be performed without the subsequent cold synchronization, such as when a notification is generated that informs the user that although the remote access data has been backed up, that no synchronization has been made to the enterprise database or master database.

Figure 7:
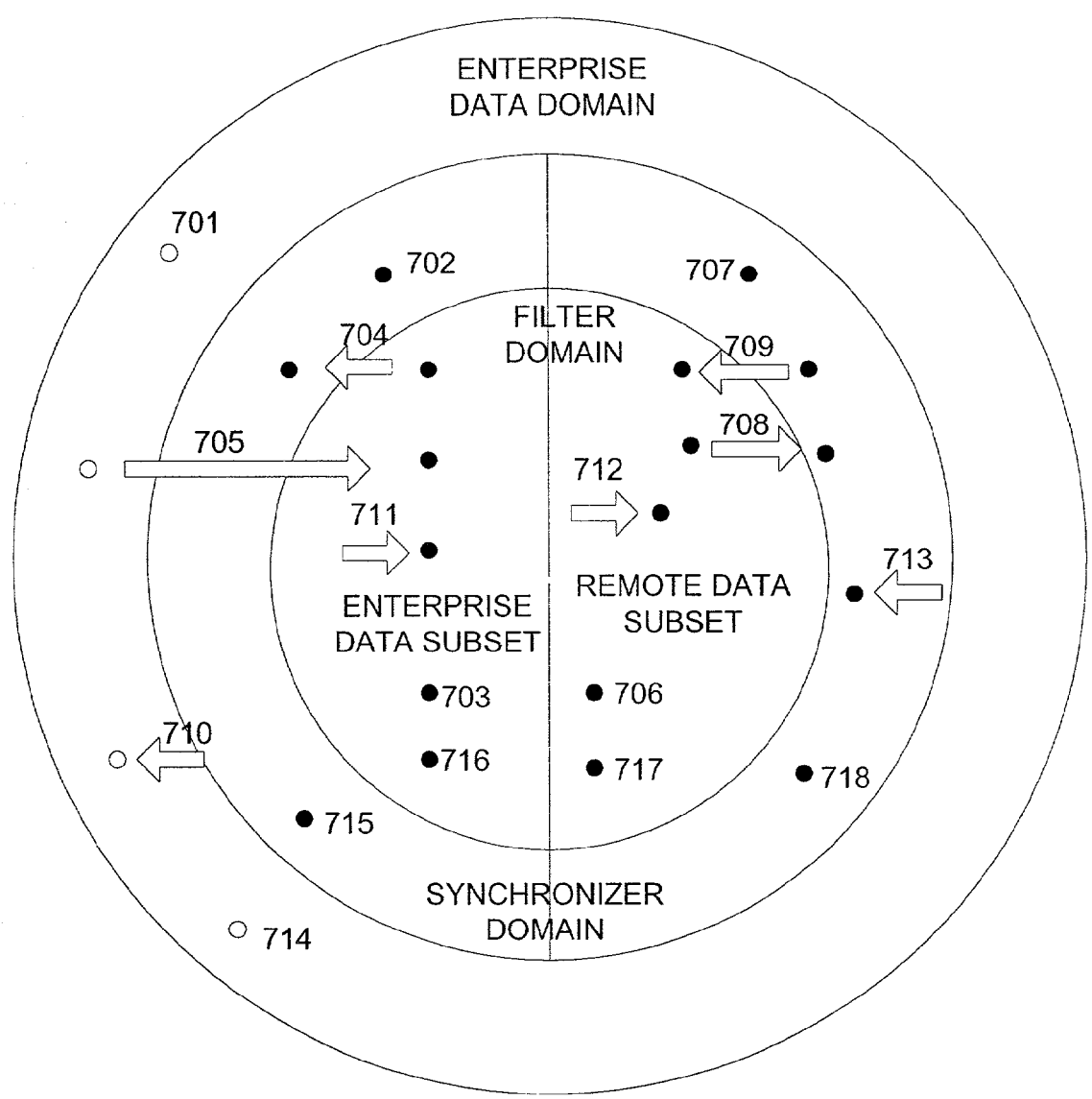
FIG. 7 is a diagram of a data domain in accordance with an exemplary embodiment of the present invention.

FIG. 7 is a diagram of a data domain 700 in accordance with an exemplary embodiment of the present invention. Data domain 700 allows data to be synchronized between an enterprise database or master database and a remote database in a manner that allows the data to be accurately tracked and maintained, and that does not require the remote database to implement database structure overhead to maintain relationships between the remote data and the master data files.

Data domain 700 includes enterprise data domain, sychronizer domain, and filter domain. Enterprise data domain includes all data within the enterprise database. Likewise, the synchronizer domain includes all data managed by the database synchronizer, whereas the filter domain includes only that data for which a filter has been identified such that the data will be stored on a hand-held device or other remote device. The filter domain and the synchronizer domain are also divided into an enterprise data subset and a remote data subset, which indicate where changes, additions, deletions, or modifications to data may occur, such as in the enterprise database or at the hand-held remote.

Data records shown as non-filled circles, such as 701, 710, and 714, are indicative of data that is maintained on the enterprise data domain but which is not stored in the filter domain or the synchronizer domain. For example, 701 indicates the enterprise domain data updated outside of the filter domain, such that the data would not be reflected on the hand-held device. Likewise, 702 demonstrates the enterprise data updated inside of the synchronizer domain but outside of the filter domain. For example, enterprise domain data updated at 702 can include data that was originally in the filter domain but which was moved into the synchronizer domain after a change occurred that removed it out of the filter domain. This change could have occurred from the enterprise database, such as in enterprise data subset or from the remote database such as in the remote data subset. The synchronizer domain is used to track such data, so as to provide an indication that the data was at least at some point in time in the filter domain.

Likewise, 703 shows the enterprise domain data updated inside of the filter domain. For example, even if no change is made to a data record on the hand-held or remote device, changes made to the enterprise data domain will be reflected at the next cold synchronization.

Point 704 indicates an enterprise domain data update that removes the data record from the filter domain. In this exemplary embodiment, the data record is maintained within the synchronizer domain even though it is no longer within the filter domain. For example, if the modification by the enterprise data removes the data from the filter domain, a suitable indicator can be generated for the user of the remote database, such as to notify them that the data record has been removed from the filter domain because of enterprise database activity.

Point 705 indicates enterprise data updated that moves the data record into the filter domain, such that the data, which may have previously not been stored on a remote access device, is now stored on the remote access device. Likewise, suitable notification data can be generated to notify the user of the remote device that the modification of the enterprise data record has now placed it within the filter domain.

Point 706 indicates remote data updated within the filter domain. In this exemplary embodiment, the remote data is updated on a hand-held device or other suitable device, and the updates are then reflected in the enterprise domain. Point 707 indicates hand-held data updated inside of the synchronizer domain but outside of the filter domain. In this exemplary embodiment, the data record may have originally been in the filter domain but have been moved out of the filter domain due to a remote data modification, enterprise data modification or other suitable data modification. This data is then tracked in the synchronizer domain for historical purposes, or other suitable purposes.

Point 708 demonstrates data modified in the remote data subset that removes the data from the filter domain to the synchronizer domain.

Point 709 likewise demonstrates modification to data using the remote device that moves the data from the synchronizer domain to the filter domain. In this exemplary embodiment, it is noted that the hand-held device can modify data within the synchronizer domain, but that it cannot modify data within the enterprise data domain, because the data in the synchronizer domain remains as an artifact on the hand-held device whereas the enterprise data domain data is not stored on the hand-held device to begin with.

Point 710 indicates enterprise data inserted outside of the synchronizer domain, such that the remote database is not involved. Point 711 indicates enterprise data inserted inside of the filter domain directly, such as where the recordset did not previously exist. Point 712 likewise demonstrates handheld data inserted into the filter domain, such as where the data record is added by the user of the remote device.

Point 713 indicates data added into the synchronizer domain. In this exemplary embodiment, the hand-held device user adds data records that were not included in the filter domain but which are now in the synchronizer domain because of the action by the user. Point 714 demonstrates enterprise data deleted outside of the filter domain.

Point 715 demonstrates enterprise data deleted outside of the filter domain but within the synchronizer domain, such as when a data record is deleted that was previously in the filter domain but which has since move to the synchronizer domain.

Point 716 indicates enterprise data deleted inside of the filter domain, such that the record is deleted by the enterprise database.

Point 717 indicates hand-held data deleted inside of the filter domain, such that the record is deleted based on actions taken by the remote access device operated.

Point 718 indicates hand-held data deleted inside of the synchronizer domain but outside of the filter domain, such that the record is removed from the synchronizer domain but not from the filter domain.

Domain diagram 700 indicates record data flows within the enterprise data domain, synchronizer domain and filter domain. As shown in data domain 700, records can enter the filter domain from the enterprise domain or the synchronizer domain, but cannot leave the synchronizer domain to the enterprise domain or cannot leave the filter domain to the enterprise domain. In this manner, once a record has been stored on the hand-held device or has met the filter domain criteria, it is tracked by the synchronizer domain, even if subsequent modification would remove it from the filter domain. Likewise, transfers of records between the filter domains and the synchronizer domains are maintained.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A computer implemented system for remote database access comprising:
    an enterprise database storing multiple sets of data;
    a data synchronizer receiving a user-defined set of data and generating a template that defines the relationship between the multiple sets of data and the user-defined set of data; and
    a remote data system receiving the user-defined set of data and receiving a user-entered data update, wherein the data synchronizer receives the user-entered data update and employs the template to map the user-entered data update to the multiple sets of data.

2. The system of claim 1 wherein the data synchronizer further comprises a remote data format system receiving the user-defined set of data and the two or more sets of data and generating one or more extensible markup language data type definitions.

3. The system of claim 2 wherein the remote data format system further comprises a remote data design system providing two or more available enterprise data fields and receiving user selection data of one or more of the enterprise data fields.

4. The system of claim 2 wherein the remote data format system further comprises an enterprise data interface system determining one or more data relationships within an enterprise database in response to the user-defined set of data.

5. The system of claim 1 wherein the data synchronizer further comprises a hot synchronization system receiving the user-entered update data and storing the user-entered update data in a hot synchronization database.

6. The system of claim 5 wherein the data synchronizer further comprises a cold synchronization system receiving the hot synchronization database and generating collision data if one or more remote change records in the user-entered update correlates to one or more enterprise change records in the enterprise database.

7. The system of claim 6 wherein the cold synchronization system further comprises a collision resolution system receiving the collision data and generating collision resolution data use one or more predetermined rules.

8. A computer implemented method for remote database access comprising:
  generating an enterprise data template for accessing an enterprise database to form a single user-defined data table, the enterprise data template defining a relationship between multiple data sets of the enterprise database and data of the single user-defined data table;
  creating a remote data table using the enterprise data template;
  updating the remote data table using a remote device; and
  updating the multiple data sets of the enterprise database with the updated remote data table using the enterprise data template.

9. The method of claim 8 wherein updating the multiple data sets further comprises generating collision data if a change has occurred to a record in the remote data table and to one or more corresponding records in the multiple data sets.

10. The method of claim 8 wherein updating the multiple data sets with the updated remote data table further comprises:

generating collision data if a change has occurred to a record in the remote data table and to one or more corresponding records in the multiple data sets; and
  receiving user-entered collision resolution data in response to the collision data.

11. The method of claim 8 wherein updating the multiple data sets further comprises:
  generating collision data if a change has occurred to a record in the remote data table and to one or more corresponding records in the multiple data sets; and
  applying one or more predetermined collision resolution rules in response to the collision data.

12. The method of claim 8 wherein updating the multiple data sets further comprises only updating records that have changed in the updated remote data table.

13. A data domain implemented on a computer for remote database access comprising:
  an enterprise data domain that includes data stored in an enterprise database;
  a synchronizer data domain that includes all data stored on a handheld remote device during a predetermined period; and
  a filter data domain that only includes data in the enterprise domain that is presently stored on the remote device, wherein the enterprise domain contains the synchronizer domain and the filter domain, and the synchronizer domain contains the filter domain.

14. The data domain of claim 13 further comprising an enterprise data subset that includes data changed in the enterprise database.

15. The data domain of claim 13 wherein data records can move from the enterprise domain to the filter domain.

16. The data domain of claim 13 wherein data records can not move from the enterprise domain to the synchronizer domain.

17. The data domain of claim 13 further comprising a remote data subset that includes data changed in the remote device.

18. The data domain of claim 13 wherein data records can move from the filter domain to the synchronizer domain.

19. The data domain of claim 13 wherein data records can not move from the synchronizer domain to the enterprise domain.

20. The data domain of claim 13 wherein data records can not move from the filter domain to the enterprise domain.

* * * * *